United States Patent
Tohyama et al.

(10) Patent No.: US 7,019,873 B2
(45) Date of Patent: Mar. 28, 2006

(54) IMAGE READING APPARATUS

(75) Inventors: Tetuyuki Tohyama, Yamanashi-ken (JP); Masaki Fukuda, Yamanashi-ken (JP)

(73) Assignee: Nisca Corporation, Yamanashi-ken (JP)

( * ) Notice: Subject to any disclaimer, the term of this patent is extended or adjusted under 35 U.S.C. 154(b) by 809 days.

(21) Appl. No.: 09/961,053

(22) Filed: Sep. 24, 2001

(65) Prior Publication Data

US 2002/0036808 A1 Mar. 28, 2002

(30) Foreign Application Priority Data

Sep. 25, 2000 (JP) .............................. 2000-289715

(51) Int. Cl.
*H04N 1/04* (2006.01)
*G03G 15/00* (2006.01)

(52) U.S. Cl. ...................... 358/496; 358/497; 358/498; 358/474; 358/408; 399/374; 399/367

(58) Field of Classification Search ................ 358/498, 358/296, 496, 497, 474, 448, 447, 408; 399/374, 399/367
See application file for complete search history.

(56) References Cited

U.S. PATENT DOCUMENTS

| 4,743,974 A | * | 5/1988 | Lockwood | .................. 358/494 |
| 6,122,077 A | * | 9/2000 | Kaji | ........................... 358/448 |
| 6,721,074 B1 | * | 4/2004 | Kao | ........................... 358/496 |
| 6,760,131 B1 | * | 7/2004 | Kaji | ........................... 358/474 |

FOREIGN PATENT DOCUMENTS

| JP | 7-327111 | 12/1995 |
| JP | 11-32164 | 2/1999 |
| JP | 11-136444 | 5/1999 |

* cited by examiner

*Primary Examiner*—Edward Coles
*Assistant Examiner*—Houshang Safaipour
(74) *Attorney, Agent, or Firm*—Manabu Kanesaka

(57) ABSTRACT

An image reading apparatus has a reading mode to read an image on a still document, and a reading mode to read an image on a moving document, and includes a first reading device to read one surface of the still document at a first reading station and a document moving at a second reading station, and a second reading device for reading the other surface of the document moving at a third reading station. The first, second and third reading stations are arranged adjacent to each other along the document transfer direction. A compact and light weight system capable of stable transport of the document and of quality image reading is thereby attained.

7 Claims, 4 Drawing Sheets

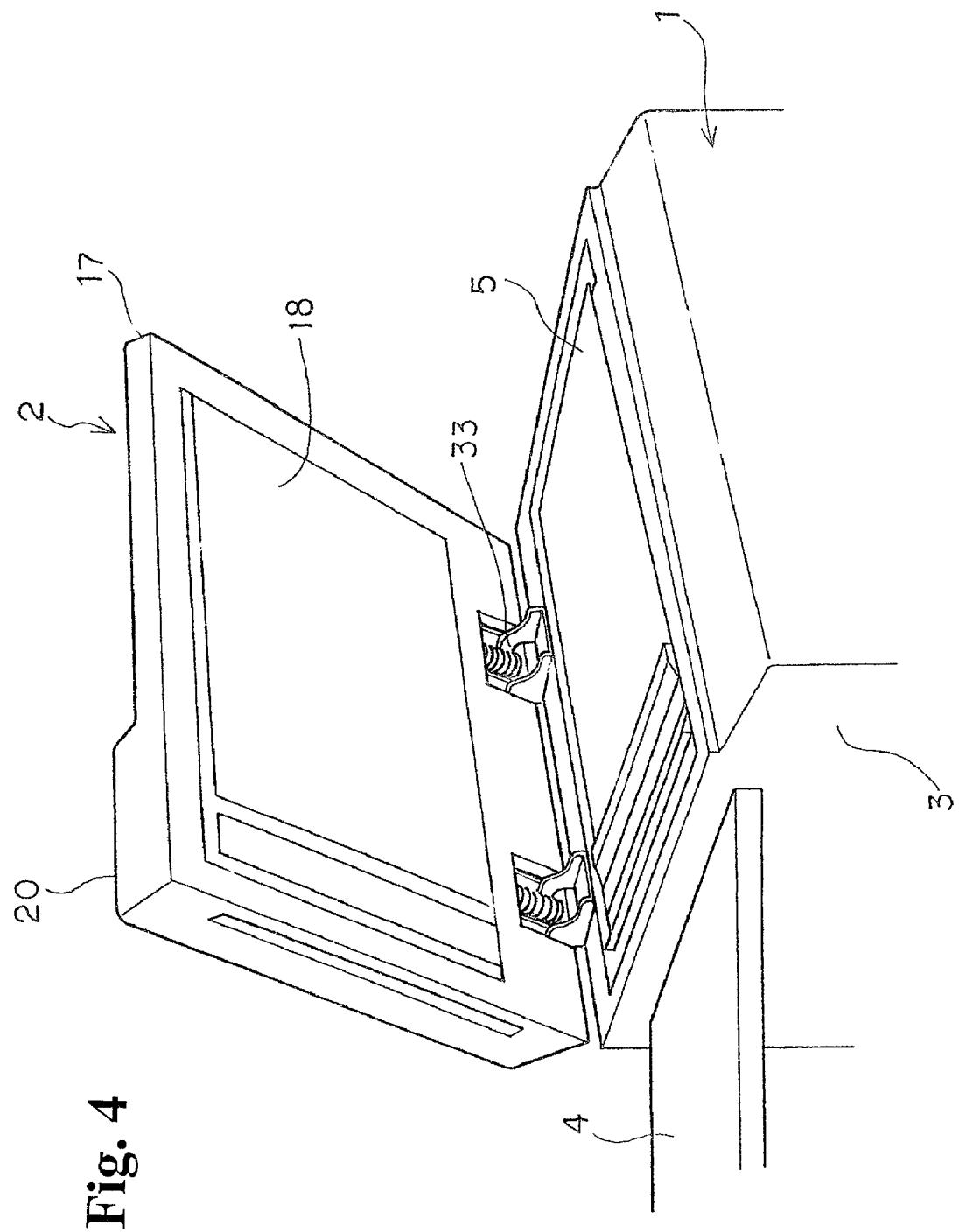

US 7,019,873 B2

IMAGE READING APPARATUS

BACKGROUND OF THE INVENTION AND RELATED ART STATEMENT

This invention relates to an image reading apparatus for scanning and optically reading document images and outputting them as electronic data. More particularly, this invention relates to an image reading apparatus equipped with two optical reading means for reading the images on the front and back sides of the documents or sheets fed one by one from a document reception tray by an automatic document feeder commonly known as an ADF.

Image reading apparatuses, normally called scanners, optically read the image of a document and convert the image into electronic data and transmit it to image forming apparatuses, such as personal computers, copy machines or facsimiles. There are following types of image reading apparatuses.

In the image reading apparatuses, there are a method wherein a thick document sheet, such as a book is placed on a platen formed above an image reading apparatus unit and this still document sheet is read by moving reading means, and a sheet throughput method wherein an automatic document feeder repeatedly feeds documents or sheets one by one from a supply tray to a platen at which still image reading means reads the documents as they move over the platen. Recently, the sheet throughput reading method has a function for simultaneously reading both the front and back surfaces of documents or sheets using two independent reading means on one transport path without requiring the documents to invert from front to back.

Examples of such sheet throughput image reading methods on image reading apparatuses that are equipped with two reading means to read the images on the front and back sides of the documents are disclosed in Japanese Patent Publications (KOKAI) No. 7-327111, No. 11-136444 and No. 11-32164.

In Japanese Patent Publication No. 7-327111, a platen for a still document situated above an image reading apparatus is used as a platen for so-called sheet throughput method to form a document transport path to feed and transport the documents to this commonly used platen. Also, two reading means opposingly arranged to sandwich the document transport path are used to read both the front and back surfaces of the documents that pass through this document transport path. Furthermore, one of the two reading means moves underneath the commonly used platen to read the still document manually placed upon the commonly used platen.

Also, in Japanese Patent Publication No. 11-136444, a platen for the still documents is located above an image reading apparatus, and a transport path for sheet throughput reading is located above the platen for the still documents. Also, between this platen for the still documents and the transport path, there is formed a light source for reading one surface of the document and a mirror to read the one surface of the document passing through the transport path, and on the opposite side of the light source and the mirror, reading means is arranged to read the other surface of the document.

Still further, Japanese Patent Publication No. 11-32164 discloses an image reading apparatus for reading both surfaces of the documents comprising a contact image sensor and optical reduction reading means above and below a document sheet transport path, wherein a document from a supply tray is inverted and transported to read one surface of the document that passes through a platen for sheet throughput disposed in the image reading apparatus; then the other surface of the document is read with reading means formed in the automatic document feeder at a side opposite to the platen for the sheet throughput; and the document is discharged to a discharge tray. Also, in the document sheet discharge direction of this image reading apparatus for reading both surfaces of the document, the platen for reading the still document is arranged such that the document manually placed thereupon is read by moving optical reduction reading means.

However, because both of the two reading means in the sheet throughput reading method of the image reading apparatus disclosed in Japanese Patent Publication No. 7-327111 employ an optical reduction reading method, there are problems such that the image reading apparatus that includes the automatic document feeder is larger and heavier.

Also, because in the image reading apparatus disclosed in Japanese Patent Publication No. 11-136444, the document sheet transport path, the light source for reading one surface of document sheets, the mirror and the reading means for reading one surface of document are formed in the automatic document feeder that opens and closes the platen for the still document, there are problems such that the image reading apparatus including the automatic document feeder is larger and heavier and the structure is complex.

In the image reading apparatus disclosed in Japanese Patent Publication No. 11-136444, the reading means for reading one surface of the document is arranged above (opposite side) the platen for reading the sheet throughput and the supply tray is arranged above the reading means for reading the other surface of the document, so there are problems such that the image reading apparatus including the automatic document feeder is larger. Furthermore, because it forms a U-shaped paper feed path to invert and transfer the document from the supply tray to the platen for the sheet throughput, the sheet passes through the platen for the sheet throughput reading to cause the sheet to endure an unusual posture and cause the sheet to flap when transferring into the platen for the sheet throughput and discharge. This makes it difficult to obtain quality reading of the images on the document. Also, there is a space wasted in the lower section in the vertical direction of the second reading means established in the automatic document feeder on the image reading apparatus, so the entire image reading apparatus including the automatic document feeder can not be made more compact.

An object of the present invention is to make the external shape of an image reading apparatus that is capable of simultaneously reading both the front and back surfaces of the document or sheet more compact and lighter in weight, and to provide an image reading apparatus that transports the document one by one in a stable manner using an automatic document feeder and that can provide quality image reading using two reading means opposingly arranged close to each other.

SUMMARY OF THE INVENTION

An image reading apparatus of the invention has a reading mode for reading an image on a still document and a reading mode for reading a image on a moving document. The image reading apparatus comprises a first reading station for reading the still document, a second reading station for reading an image on one surface of the moving document, a third reading station for reading an image on the other surface of the moving document, first reading means of an optical reduction system configured to move to read the image on the still document at the first reading station and to be still to read the image on one side of the moving document at the second reading station, second reading means of a contact image sensor to read the image on the other surface of the documents moving at the third reading station opposingly arranged to the second reading means, a supply tray to stack the document arranged above the first reading station, a transport path to guide the document on the supply tray to the second reading station and to the third reading station, and a discharge tray to store the document read at the second reading section and the third reading station. The first reading station, second reading station and third reading station are arranged in order adjacently in the direction of document transport.

BRIEF DESCRIPTION OF THE DRAWINGS

FIG. 4 is perspective view showing an upper unit of the image reading apparatus according to the embodiment shown in FIG. 1 in an open state.

DETAILED DESCRIPTION OF PREFERRED EMBODIMENT

The following is a detailed explanation of the preferred embodiment of the present invention based on the figures provided.

Figure 1:
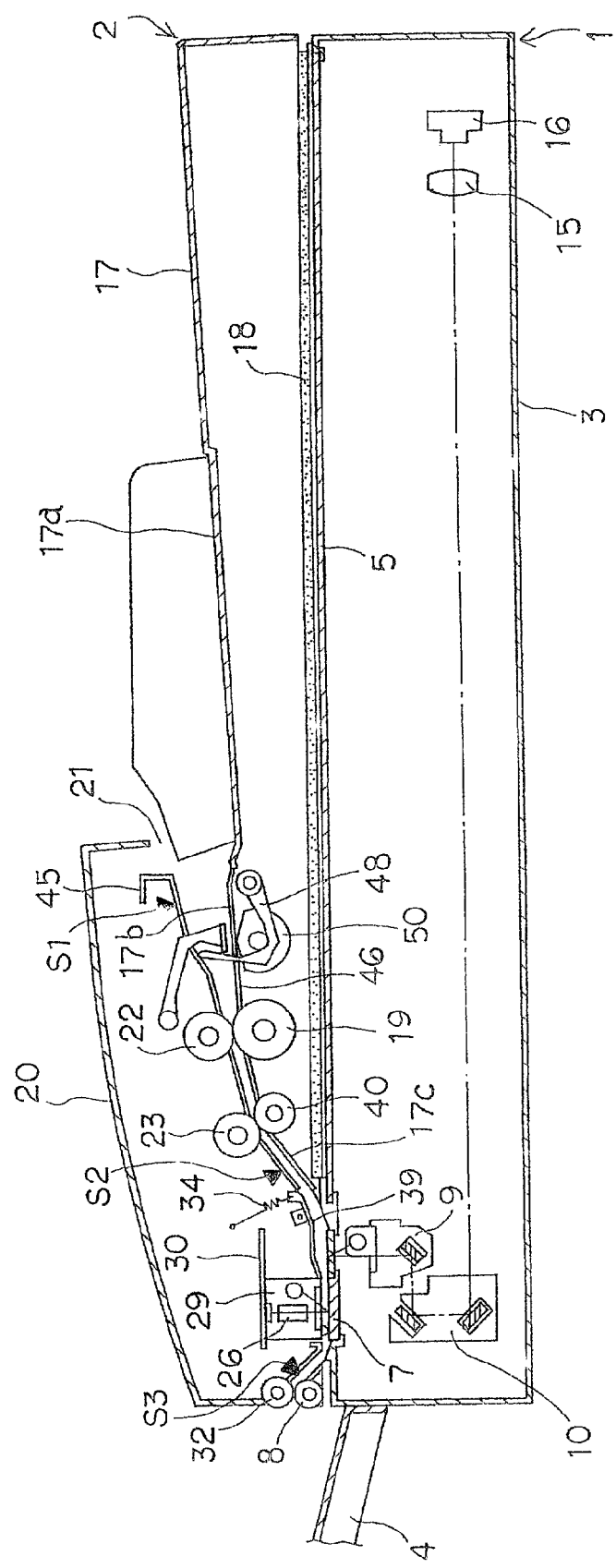
FIG. 1 is a longitudinal sectional view of the entire structure of an image reading apparatus according to an embodiment of the invention.
Figure 2:
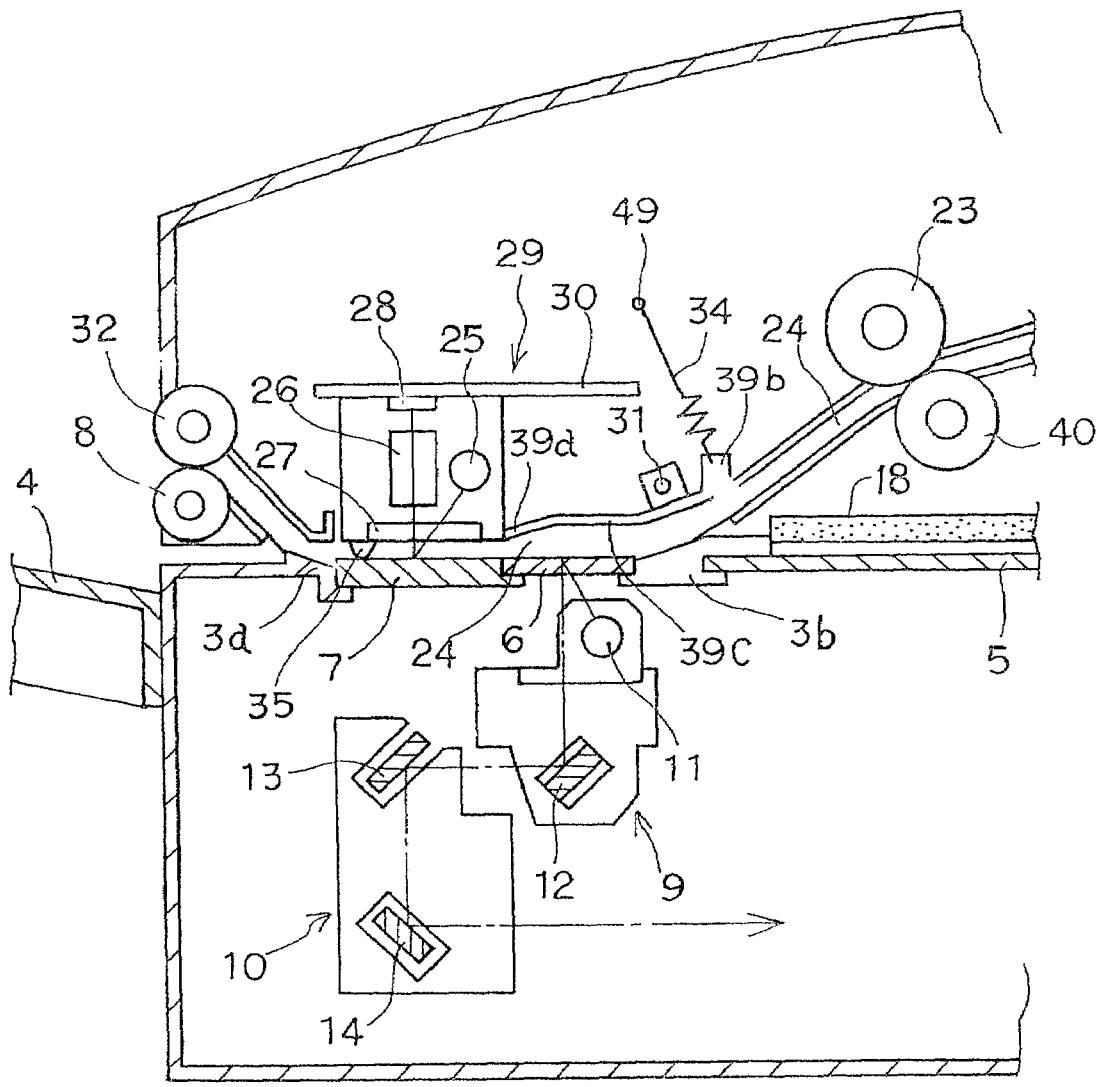
FIG. 2 is an enlarged sectional view of essential members of the embodiment shown in FIG. 1.
Figure 3:
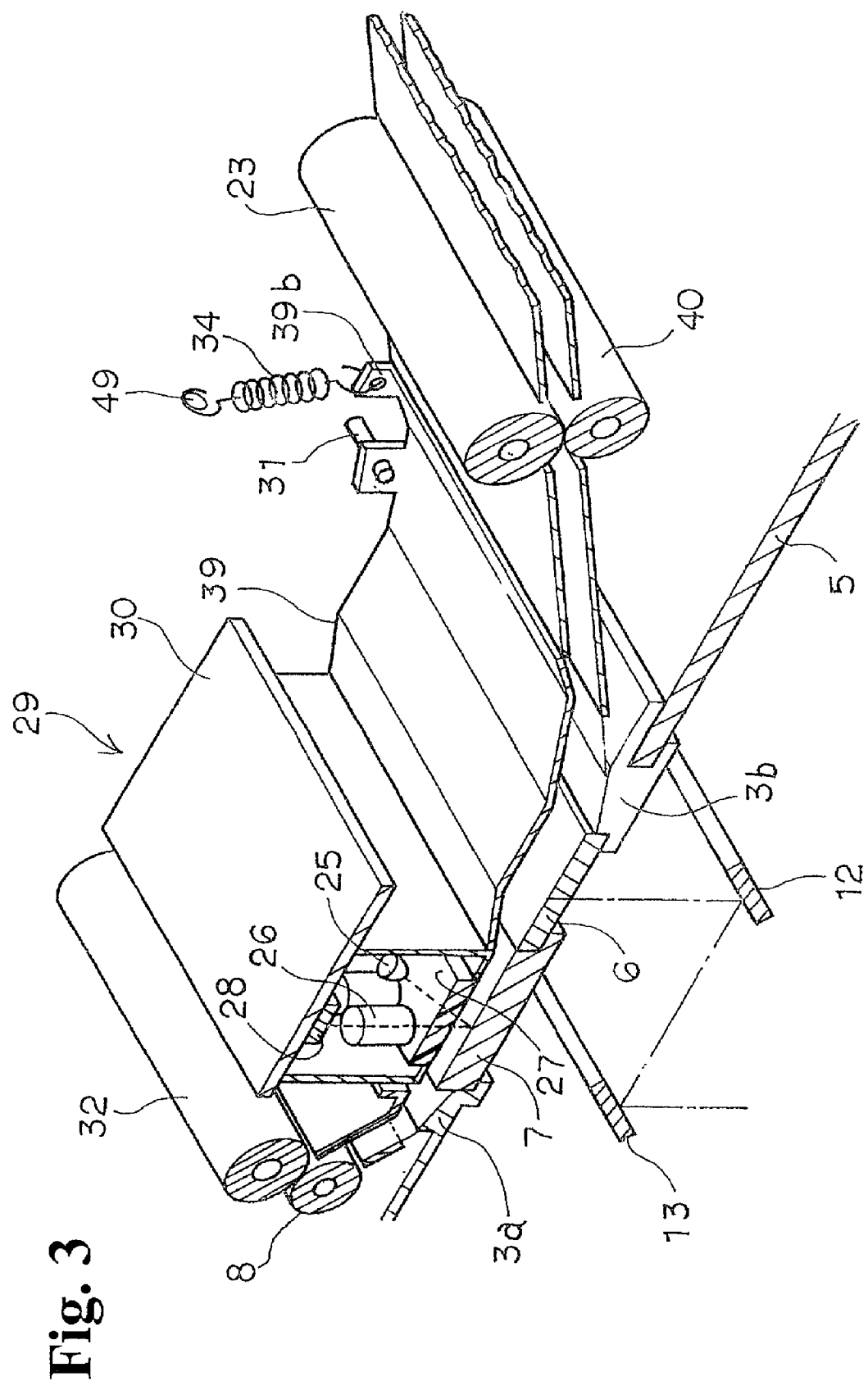
FIG. 3 is a perspective view including a CIS unit shown in FIG. 2.

FIG. 1 is a longitudinal sectional view of the entire structure of the image reading apparatus according to the invention. FIG. 2 is an enlarged sectional view of the essential members of FIG. 1. FIG. 3 is a perspective view of the essential members of FIG. 2. FIG. 4 is a perspective view from the front of FIG. 1 showing an upper unit of the image reading apparatus according to this embodiment with the top open.

In FIG. 1 to FIG. 4, numeral 1 refers to a main unit or image reading apparatus. An upper unit 2 (ADF) is mounted to open relative to the main unit 1 by a hinge 33 (shown in FIG. 4). The outer side of the unit 1 is formed by a frame 3 and a discharge tray 4 is fastened to one side of the frame 3.

Also, on the upper side of the frame at the opposite side of the discharge tray 4, there is incorporated a platen 5 (first platen glass) formed of a transparent glass plate for placing a thick original for reading by opening the upper unit in the upper direction as shown in FIG. 4.

Also, on the opposite side of platen glass 5 relative to the fastening unit 3b which is a part of the frame 3 to fasten the platen glass 5, a platen 6 (second platen glass) formed of a transparent glass plate to support a document for reading the images, the documents being fed one by one, and a guide plate 7 (second guide means) which is formed of a non-transparent white material to support the documents for reading the images, the documents being fed one by one similarly, are formed as one unit. The fastening unit 3b fastens the platen glass 6 to a notched portion on the edge of the platen glass 6. The platen glass 6 and guide plate 7 are substantially the same rectangular shape and their thicknesses are formed to be exactly the same.

Also, on the upper surface of the frame 3, a fastening unit 3a is formed to fasten the guide plate 7 as in the fastening unit 3b. The platen glass 6 edge of the guide plate 7 is formed with a notch of equivalent thickness as that of the platen 6 to abut against the platen glass 6 to be fastened. In this way, the edges of the platen glass 6 and the guide plate 7 are both supported by the fastening units 3a and 3b, and the other edges are respectively fastened to other edges and their upper surfaces are fastened to the frame 3 to form a single flat surface.

A pair of discharge rollers 8 and 32 is formed on the end of the upper unit 2 on the discharge tray 4 side to discharge the documents. Discharge roller 8 is driven by a motor that is not shown in the drawings.

The frame 3 houses optical reduction reading means (first reading means) to read and reduce the images and to convert them into electrical signals. Numerals 9 and 10 are carriages that form a part of the reduction optical system reading means, and while being interlocked to maintain a prescribed distance relationship when driven by a motor that is not shown in the drawings. In other words, the carriage 10 moves at a half displacement relative to the carriage 9 inside the frame 3 in the left and right directions of the drawing. On the carriage 9, there is mounted a light source 11 for producing light to illuminate the document in a fixed position or during moving, and a reflecting mirror 12 for receiving light reflected from the document illuminated by the light source 11 and converting the direction to a horizontal direction reflected light. On the carriage 10, there are mounted a reflective mirror 13 to convert the horizontally reflected light reflected from the reflective mirror 12 to a vertical light, and a reflective mirror 14 that converts the direction of vertically reflected light reflected by the reflective mirror 13 to a horizontally reflected light that is in a direction opposite to that of the light reflected from the reflective mirror 12.

Numeral 15 is a light condensing lens for focussing light received from the reflective mirror 14, and numeral 16 is an image sensor comprised of a CCD to receive the reflected light focused by the light condensing lens 15 and to convert that to electrical signals. The carriages 9 and 10, light source 11, reflective mirrors 12 to 14 and the light condensing lens 15 and image sensor 16 form the optical reduction reading means. The output end of the image sensor unit 16 is connected to a lead wire, not shown in the drawings. Through this lead wire, the image signals of the light that was reflected from the document are converted and transmitted as the electrical signals into an electrical device, such as a facsimile device and a copy machine unit which is not shown in the drawings.

The outside of the upper unit 2 is formed by a frame 17 and an outer cover 20. A pressure member 18 having resiliency to lightly press and hold a document placed on the platen glass 5 is attached to the unit corresponding to the platen glass 5 on the main unit 1 below the frame 17. The pressure member 18 is formed of a layer with multiple holes having a thickness that allows resilient deformation and a soft white film member covering the layer with multiple holes from the bottom surface. Numeral 17a is a document reception tray for stacking the documents to be fed one by one and indicia thereof to be read.

The document reception tray 17a is formed to become low at the side of the platen glass 6 with an angle to allow the documents to move smoothly to the platen glass 6. To the platen glass 6 on the oblique surface of the document reception tray 17a, there are formed a draw-out roller 50 to draw-out the documents placed on the document reception tray 17a, a feed roller 22 to feed the documents drawn out by draw-out roller 50 one by one to the platen glass 6 and a separating roller 19 to separate the documents pressed against the feed roller 22. A part of the frame 17 on the right side of the feed roller 19 forms the flat portion 17b. Between this flat portion 17b and the outer cover 20, which houses the contact image sensor, described later, a feed entrance 21 is formed to receive the documents to transport them one by one to the platen glass 6.

Between the feed roller 22 and the platen glass 6, there is formed a pair of register rollers 40 and 23 to transport the document inserted from the feed roller 22 to the top of the platen glass 6 and guide plate 7. Also, a document transport path 24 is formed to have an oblique section 17c from the feed roller 22 up to the discharge roller 8 facing the flat portion 17b and the platen glass 6 passing through the upper and lower plate members 45 and 46. Register rollers 23 and 40 are driven by a motor that is not shown in the drawings. Furthermore, numeral 48 is a stopper to arrest the insertion of the documents transported from the document reception tray 17a into the transport path 24 and to enable the feeding of documents by retracting downward when feeding the documents.

A light source 25 for illuminating the images on the back-side (side facing upward) of the document transported into the transport path 24, a contact glass 27 through which the illuminated light and the light reflected from the back-side of the document pass, a SELFOC lens 26 to make the reflected light parallel, a line image sensor 28 that detects the light passing through the SELFOC lens and converts it into electrical signals, and a circuit board 30 form a single unit as the compact image sensor (second reading means, called CIS below) unit 29 in the contact reading means (second reading means) in the outer cover 20.

A plate-shaped backup guide 39 (first guide means) is fastened at a front section 39a to the CIS unit 29 in the direction of transport. The backup guide 39 includes the rear section 39b abutting against the oblique section 17c to form the transport path 24 together with the fixed section 3b therebetween, a planar section 39c that forms the transport path together with the platen glass 6 therebetween, and the front section 39a that is connected to the bottom of the CIS unit 29 while slightly inclining downward at a substantially fixed angle. In other words, the backup guide 39 forms the reading path for reading the document with the optical reduction reading means between the fixed section 3b on the frame 3 and the platen glass 6.

The backup guide 39 is supported on a pair of rotation pins 31 (FIG. 3) that protrude from the left and right side plates 42 on the outer cover 20, and the CIS unit 29 rotates by using the rotation pins 31 as the fulcrum. Also, one end of each tension spring 34 to press downward the CIS unit 29 is attached to the rear section 39b in the backup guide 39 (FIG. 3) and the other end thereof is attached to the spring support member 49 which protrudes to the side from the upper side of the left and right side plates 42.

Protrusions 35 are fixed to the left and right corners of the edges, in the transport direction, on the CIS unit 29, and these protrusions 35 touch the upper surface of the main unit 1 thereby providing a gap for the reading path (first transport path) between the platen glass 6 and backup guide 39 that is larger than a gap for the reading path (second transport path) between the guide plate 7 and the bottom contact glass 27 of the CIS unit 29 so that the document is transported in a stable manner within the focus depth for each of the reading path gaps and that the lights of the images focussed can be received by the image sensors 16 and 28.

For example, the reading transport gap between the platen glass 6 and the flat portion 39c of the backup guide 39 is set at 2 mm, and the reading transport gap between the guide plate 7 and contact glass 27 is set at 0.5 mm.

Furthermore, according to the image reading apparatus of the present embodiment, a plurality of sensors S1, S2 and S3 is formed to detect the position of the document and the presence or absence of the images thereon, and a control circuit (not shown in the drawings) is formed to control the motors (not shown in the drawings), the movements of the carriages 9 and 10, on and off of the light sources 11 and 25, and the image sensors 16 and 28 based on the detection signals of the sensors.

The operation according to this embodiment is explained below.

First, in the reading apparatus set as shown in FIG. 1, the backup guide 35 receives the moment of rotation in the counterclockwise direction by the tension spring 34 around the rotation pins 31. The CIS unit 29 mounted on the backup guide 39 is a floating structure that sags downward slightly when the outer cover 20 is opened, and when the outer cover is closed, the protrusions 35 on the CIS unit 29 touch the upper surface of the main unit 1 to move it upward. This floating structure provides the gaps for the reading transport path (first transport path) between the platen glass 6 and the backup guide 39, and the reading transport path (second transport path) between the guide plate 7 and the contact glass 27 on the bottom of the CIS unit.

When feeding the documents one by one to the first and second image sensors to copy or obtain images to transfer, the documents are placed and stacked on the document reception tray 17a on the upper unit 2. These documents pass through the feed entrance 21 one by one by means of the feed stopper 48, and are supplied to the platen glass 6 passing through the transport path 24 by the respective pairs of feed rollers 19 and 22, and 40 and 23. At this time, the carriage 9 in the unit 1 shown in FIGS. 1 and 2 is fixed below the platen glass 6 and the carriage 10 is fixed below the guide plate 7, i.e. the contact glass 27.

After passing a predetermined amount of time since the document sensor S2 detects the leading edge of the document, the control circuit recognizes that the document has reached the top of the platen glass 6, and the control circuit lights the document with the light from the lighting source 11 while the carriages 9 and 10 being stopped at their stopping positions. The illuminated light passes through the platen glass 6 which is a transparent glass plate, and illuminates the front side of the document. The light reflected from the front surface of the document is input into the light condensing lens 15 through the reflective mirrors 12, 13 and 14. The reflected light input to the light condensing lens 15 is collected in the image sensor 16 and a reduced image of the front surface of the document (surface facing downward) is obtained in the image sensor 16 by the light condensing lens 15. The image sensor 16 sends the electrical signals that correspond to the reduced image to the electronic device main unit based on the control signals coming from the control circuit, and the electronic device generates or transmits the image based on this electrical signals.

Because the gap with the platen glass 6 and the parallel portion 39c is set according to a comparatively large depth of focus for the optical reduction image sensor, it is possible to transport the document to the platen glass 6 comparatively easily without problems, such as paper jams.

Next, the document moves above the guide plate 7 opposite to the contact image sensor. In this case, the platen glass 6 and the guide plate 7 are structured into one unit, and the upper surfaces of the platen glass 6 and the guide plate 7 form the same flat surface to enable the smooth transfer of the document.

Because the front oblique portion 39a continues obliquely downward from the parallel portion 39c and is connected to the CIS contact lens 27, it guides the document smoothly downward toward the top surface of the guide plate 7.

The control circuit recognizes the arrival of the document to the reading position on the guide plate 7 by the passing of the second time from the detection of the leading edge of the document sheet by the document sensor S2. Then, the light source begins illuminating the document. Light from the light source 25 passes through the contact lens 27 and illuminates the back side of the document. Light reflected from the back-side of the sheet again passes through the contact lens 27, is made parallel by the SELFOC lens 26, and is then supplied into the CCD image sensor 28. The image sensor 28, using the control of the control circuit, outputs an electrical signal that corresponds to the reflected light to the electronic device of the main unit which regenerates or transfers the image on the back-side of the document.

The document, front and back sides of which have been read, is discharged from the external cover 20 and is stacked on the discharge tray 4 by the pair of discharge rollers 8 and 32.

The above operations are performed for reading both sides of the document. The following is the reading of a thick document placed on the platen glass 5.

The document is placed upon the platen glass 5, and when an operation start switch to indicate the starting of the copying or transmission of the document placed upon the platen glass 5 is pressed, the control circuit outputs a control signal to move the carriages 9 and 10 in the right direction of FIG. 1 by a motor that is not shown in the drawings. The control circuit simultaneously transmits a control signal to the light source 11 to illuminate, and the light source 11 continues to illuminate the document surface on the platen glass 5 as the carriage 9 moves in the right direction of FIG. 1. Because the platen glass 5 is made of transparent glass, the illuminated light from the light source 11 passes through the platen glass 5 to illuminate the surface of the document on the platen glass 5. The light reflected from the front surface of the document passes through the platen glass 5 again, and in the same way as in the platen glass 6, is reflected by the reflective mirrors 12, 13 and 14, and passes through light condensing lens 15 to create an image on the image sensor unit 16 as a reduced image. Electrical signals that correspond to the reduced image are output from the image sensor 16, and the image is formed or transferred based on these electrical signals by the electronic device.

In the invention, the external shape of the image reading apparatus that is capable of simultaneously reading both the front and back surfaces of the document or sheet can be made compact and lighter in weight. Also, the image reading apparatus can transport the document one by one in a stable manner using the automatic document feeder, and can provide the quality image reading using two reading means opposingly arranged close to each other.

While the invention has been explained with reference to the specific embodiment of the invention, the explanation is illustrative, and the invention is limited only by the appended claims.

What is claimed is:

1. An image reading apparatus having a mode for reading an image on a still document and a reading mode for reading an image on a moving document, comprising;

a first reading station having a first platen glass to support a still document for reading an image of the still document, a second reading station having a second platen glass situated adjacent to the first platen glass for reading one surface of the moving document, and first guide member facing the second platen glass, a third reading station situated slightly away from the second platen glass and having a contact glass for reading the other surface of the moving document situated at a side opposite to the second reading station and formed integrally with the first guide member as one unit, and a second guide member adjacent to the second platen glass to face the contact glass, said first platen glass, second platen glass and second guide member being arranged linearly in a horizontal direction in this order on a same plane such that document guide surfaces thereof have same heights, and said second platen glass and said second guide member form a continuous flat document guide, supporting means for swingingly supporting said first guide member and said contact glass, a supply tray situated above the first platen glass to stack the document, a discharge tray for storing the document that have been read, a transport path to guide the document on the supply tray from a portion between the first and second platen glasses to the second platen glass and the second guide member in this order in a direction opposite to the first platen glass, first reading means configured to move between the first platen glass and the second platen glass adjacent thereto, said first reading means being moved to read the image of the still document on the first platen glass and immovably disposed to read an image of the one surface of the moving document moving on the second platen glass at the second reading station, and second reading means for reading the other surface of the document passing through the contact glass at the third reading station, wherein said second platen glass and said contact glass are formed in positions such that the document is simultaneously read by the first reading means and the second reading means.

2. An image reading apparatus according to claim 1, wherein said first reading means is an optical reduction system and comprises a first carriage having a light source for illuminating the document, a lens to collect light, a second carriage having a mirror to guide light from the document to the lens, and an image sensor to convert the light collected from the lens into electrical signals, said second carriage being still below the second platen glass in the vertical direction when reading the document passing through said second reading means.

3. An image reading apparatus according to claim 2, wherein said first carriage and said second carriage are movably supported.

4. An image reading apparatus according to claim 2, wherein said second reading means is a contact image reading unit having a light source for illuminating the document, a SELFOC lens for collecting light and an image sensor having a sensor array for converting the light collected in the lens by the sensor array into electrical signals.

5. An image reading apparatus according to claim 1, further comprising supply means for supplying the document on the supply tray to the second reading station, and discharge means for discharging the document passing through the second reading station and the third reading station to the discharge tray, said transport path extending in a same direction as a supply direction of the document supplied by the supply means and a discharge direction discharged by the discharge means.

6. An image reading apparatus having a reading mode for reading an image on a still document and a reading mode for reading an image on a moving document, comprising:

a first reading station for reading an image of the still document, a second reading station situated adjacent to the first reading station for reading an image on one surface of the moving document, a third reading station situated adjacent to the second reading station at a side opposite to the second reading station for reading an image on the other surface of the moving document, said first, second and third reading stations being arranged adjacent to each other in this order, first reading means arranged to move for reading the image of the still document at the first reading station and disposed immovably for reading the image on the one surface of the moving document at the second reading station, said first reading means including a first carriage moving between the first reading station and the second reading station adjacent thereto and having a light source for illuminating the document, a lens to collect light, a second carriage moving in synchronous with movement of the first carriage and having a mirror to guide light from the document to the lens, and an image sensor to convert the light collected at the lens into electrical signals, said first carriage being located under the second reading station and said second carriage being located under the third reading station so that the document passing through the second reading station is read, second reading means for reading the image on the other surface of the document moving at the third reading station situated at a side opposite to the second reading station, a supply tray to stack the document, a transport path to guide the document on the supply tray from a portion between the first and second reading stations to the second reading station and the third reading station in this order in a direction opposite to the first reading station, and a discharge tray to store the document read at the second reading section and the third reading station.

7. An image reading apparatus according to claim 6, further comprising supply means for supplying the document on the supply tray to the second reading station, and discharge means for discharging the document passing through the second reading station and the third reading station to the discharge tray, said transport path being formed to extend in a same direction as a supply direction of the document supplied by the supply means and a discharge direction discharged to the discharge means.

* * * * *